United States Patent
Burgess et al.

(10) Patent No.: US 12,379,265 B2
(45) Date of Patent: Aug. 5, 2025

(54) ANTI-ICING AND DE-ICING HEATED LOCK PIN SYSTEM

(71) Applicant: Goodrich Actuation Systems Limited, Solihull West Midlands (GB)

(72) Inventors: Graham James Burgess, Telford (GB); Daniel Foster, Pelsall (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 896 days.

(21) Appl. No.: 17/166,323

(22) Filed: Feb. 3, 2021

(65) Prior Publication Data

US 2021/0247247 A1 Aug. 12, 2021

(30) Foreign Application Priority Data

Feb. 7, 2020 (EP) .................................... 20275028

(51) Int. Cl.
*G01K 15/00* (2006.01)
*B64D 15/12* (2006.01)
*H05B 1/02* (2006.01)

(52) U.S. Cl.
CPC ........... *G01K 15/007* (2013.01); *B64D 15/12* (2013.01); *H05B 1/0236* (2013.01)

(58) Field of Classification Search
CPC ........ B64D 15/12; B64D 15/20; B64D 15/22; H05B 1/0236
USPC ...... 219/494, 202, 466.1; 244/134 D, 134 R, 244/129.4
See application file for complete search history.

(56) References Cited

U.S. PATENT DOCUMENTS

| 4,488,403 A | 12/1984 | Barto |
| 4,882,908 A | 11/1989 | White |
| 5,710,408 A | 1/1998 | Jones |
| 5,957,384 A | 9/1999 | Lansinger |

(Continued)

FOREIGN PATENT DOCUMENTS

| CN | 103498960 A | 1/2014 |
| CN | 205736770 U | * 11/2016 |

(Continued)

OTHER PUBLICATIONS

Extended European Search Report for International Application No. 20275028.7 dated Aug. 14, 2020, 5 pages.

*Primary Examiner* — Steven W Crabb
*Assistant Examiner* — Alba T Rosario-Aponte
(74) *Attorney, Agent, or Firm* — CANTOR COLBURN LLP

(57) ABSTRACT

A system for detecting a fault in a locking pin for use in an aircraft includes the locking pin; means for receiving a static air temperature; and a controller; wherein said locking pin comprises an internal heater element and at least one internal temperature sensor provided therein. The system also includes means for transmitting said measured temperature sensor information from said at least internal temperature sensor and said static air temperature information to said controller. The controller is configured to compare the static air temperature information with said locking pin temperature sensor information and determine if a difference between the measurements is above a static v. internal temperature threshold value.

3 Claims, 1 Drawing Sheet

(56) References Cited

U.S. PATENT DOCUMENTS

| | | | |
|---|---|---|---|
| 7,775,481 B2 * | 8/2010 | Jopp | .................. E05C 9/04 |
| | | | 219/466.1 |
| 2014/0234083 A1 | 8/2014 | Sarri et al. | |
| 2018/0277867 A1 | 9/2018 | Son | |
| 2019/0277060 A1 * | 9/2019 | Dahmer | ............ F03G 7/0614 |

FOREIGN PATENT DOCUMENTS

| | | | | |
|---|---|---|---|---|
| CN | 210714207 U | * | 6/2020 | |
| DE | 102017211541 A1 | | 1/2019 | |
| EP | 3055210 A | | 8/2016 | |
| WO | WO-0108973 A1 | * | 2/2001 | ............ B64D 15/14 |
| WO | 2015052458 A1 | | 4/2015 | |

* cited by examiner

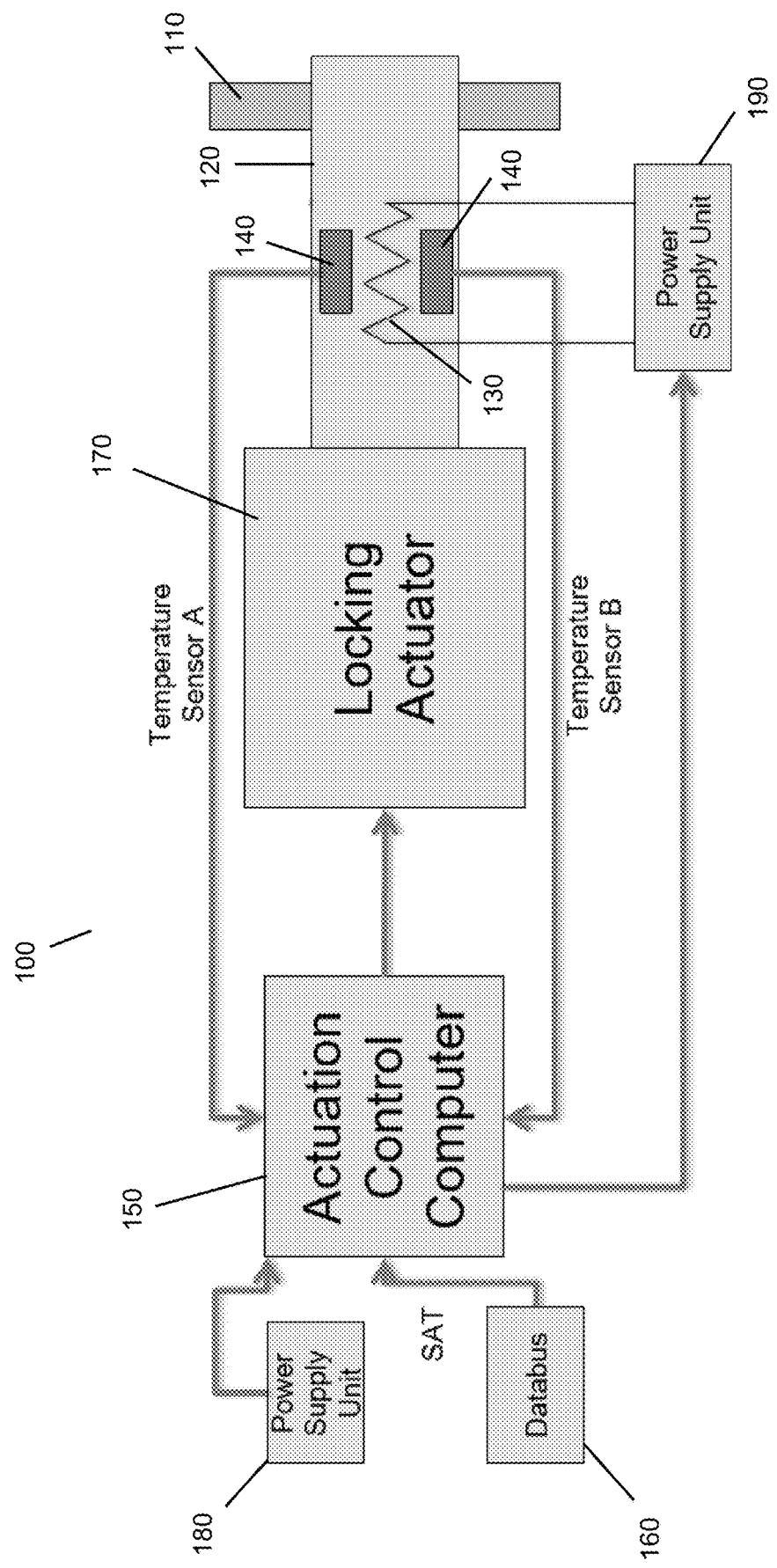

ANTI-ICING AND DE-ICING HEATED LOCK PIN SYSTEM

FOREIGN PRIORITY

This application claims priority to European Patent Application No. 20275028.7 filed Feb. 7, 2020, the entire contents of which is incorporated herein by reference.

TECHNICAL FIELD

The present disclosure relates to anti-icing systems and de-icing systems as well as methods of anti-icing and de-icing a component. The systems may be used wherein the component is a lock pin such as those used in aircraft. The systems may also be used in other technical fields.

BACKGROUND

Aircraft use lock pins to lock wings and thrust reversers in place. Ice can form on those Lock Pins, however, which results in customers providing actuation loads based on Ice Shear characteristics. When load cases based on Ice Shear are considered, Lock Pin systems will have the following disadvantages: Larger Pressure or Current requirements in order to drive excessive loads, increased size and therefore weight and cost in order to achieve excessive loads.

SUMMARY

According to a first aspect, a system is described for detecting a fault in a locking pin for use in an aircraft, said system comprising: said locking pin: means for receiving a static air temperature; and a controller; wherein said locking pin comprises an internal heater element and at least one internal temperature sensor provided therein, said system further comprising means for transmitting said measured temperature sensor information from said at least internal temperature sensor and said static air temperature information to said controller, and wherein said controller is configured to compare the static air temperature information with said locking pin temperature sensor information and determine if a difference between the measurements is above a static v. internal temperature threshold value.

In some of the examples described herein, if said difference is above said static v. internal temperature threshold value and said aircraft is not yet in flight, said controller determines that said at least one internal temperature sensor is faulty and disables said system.

In some of the examples described herein, if said difference is below said static v. internal temperature threshold value, said controller determines that said at least one internal temperature sensor is not faulty.

In some of the examples described herein, when said at least one locking pin sensor is determined as not being faulty, the controller may be configured to energise said internal heating element until said at least one internal temperature sensor reaches a heater element switch-off threshold value, and wherein upon reaching said heater element switch-off threshold, said controller may be configured to de-energise said internal heating element.

These systems may be used before flight, when the aircraft is still on the ground.

A system is also described herein for detecting a fault in a locking pin for use in an aircraft, said system comprising: said locking pin, wherein said locking pin comprises an internal heater element and at least two internal temperature sensors provided therein, and a controller; wherein said controller is configured to compare temperature information from a first of said at least two temperature sensors with a temperature information from a second of said at least two temperature sensors, and wherein if said difference between said first and second sensors is above an internal sensor comparison threshold, said controller is configured to determine that at least one of said first and second temperature sensors is faulty.

In some of the examples described herein, upon determining that at least one of said first and second temperature sensors is faulty, said controller may be configured to de-energise said internal heating element.

In some of the examples described herein, upon determining that at least one of said first and second temperature sensors is faulty, said controller may be configured to output a warning that the system requires maintenance.

A computer-implemented method performed by any of the systems described herein is also disclosed herein.

A method for detecting a fault in a locking pin for use in an aircraft is also described herein, said method comprising providing a system having said locking pin, wherein said locking pin comprises an internal heater element and at least one internal temperature sensor provided therein and means for receiving a static air temperature; and a controller. The method further comprises transmitting said measured temperature sensor information from said at least internal temperature sensor and said static air temperature information to said controller, and comparing, via said controller, the static air temperature information with said locking pin temperature sensor information and determining, via said controller, if a difference between the measurements is above a static v. internal temperature threshold value.

In some of the examples described herein, if said difference is above said static v. internal temperature threshold value and said aircraft is not yet in flight, the method may further comprise determining, via said controller, that said at least one internal temperature sensor is faulty and disabling said system.

In some of the examples described herein, if said difference is below said static v. internal temperature threshold value, said controller may determine that said at least one internal temperature sensor is not faulty.

In some of the examples described herein, when said locking pin sensor is determined as not being faulty, the method may further comprise energising, via said controller, said internal heating element until said at least one internal temperature sensor reaches a heater element switch-off threshold value, and wherein upon reaching said heater element switch-off value, de-energising, via said controller, said internal heating element.

A method for detecting a fault in a locking pin for use in an aircraft is also described herein, said method comprising providing a system having said locking pin wherein said locking pin comprises an internal heater element and at least two internal temperature sensors provided therein, and a controller; said method comprising comparing, via said controller, temperature information from a first of said at least two internal temperature sensors with a temperature information from a second of said at least two internal temperature sensors, and, if said difference between said first and second sensors is above an internal sensor comparison threshold, determining, via said controller, that at least one of said first and second temperature sensors is faulty.

In some of the examples described herein, upon determining that at least one of said first and second temperature sensors is faulty, the method may further comprise de-energising, via said controller, said internal heating element.

In some of the examples described herein, upon determining that at least one of said first and second temperature sensors is faulty, the method may further comprise outputting, via said controller, a warning that the system requires maintenance.

Any of the systems and methods described herein may be used in combination with each other or individually.

DESCRIPTION OF THE FIGURES

Certain embodiments of the present disclosure will now be described in greater detail by way of example only and with reference to the accompanying drawing in which:

FIG. 1 shows the components of the anti-icing and de-icing systems described herein.

DETAILED DESCRIPTION

The examples described herein are discussed in relation to a locking pin that may be used for the wing of an aircraft. The systems and methods described herein may also be used in other fields and with other components.

New examples of a system for anti-icing and de-icing a component such as a lock pin will now be described in detail with reference to FIG. 1. FIG. 1 depicts an aircraft structure 100 which may comprise first and second bushes 110.

In a first example, wherein the component is a lock pin 120, an electrical heater element 130 (e.g. copper beryllium) may be internally provided so that it is contained within the Lock Pin 120, along with at least one, or two internal temperature sensors (e.g. PT100) 140 to provide feedback to an Actuation System controller 150. Although an electrical heater element 130 is described here, any other suitable heating means may also be used. The heater 130 element may be powered by a power supply unit 190, or other power means.

The system also comprises means for receiving the aircraft static air temperature (SAT) 160. In some examples the Actuation System controller 150 may be configured to receive the aircraft static air temperature (SAT) from other aircraft systems over a data network. The controller 150 may be powered by a power supply unit 180, or other power means.

The system has a de-icing functionality which works as follows. At the start of an aircraft flight or mission, when the aircraft is still on the ground, the heater element 130 heats the pin so that it becomes de-iced. The Actuation System controller 150 receives the SAT temperature and compares this SAT temperature to the temperature read by the first and second internal Lock Pin temperature sensors 140. In some examples, the locking pin 120 may comprise only one internal temperature sensor 140 and the SAT temperature may be compared to the reading from this single temperature sensor. In other examples the locking pin 120 may comprise two, or at least two, internal temperature sensors 140. If the difference between these measurements is above a first threshold (referred to hereinafter as the static v. internal temperature threshold), it is assumed that at least one of the internal Lock Pin temperature sensors 140 is faulty and, in response to this, the controller is configured to disable the system.

This static v. internal temperature threshold value is therefore the allowable difference between the readings of the internal temperature sensors 140 of the locking pin 120 and the SAT readings, when the system is still being operated on the ground. If the disparity is above this first, static v. internal temperature threshold, then the system determines that there is a measurement fault.

In such a situation, the controller may then be configured to output an alert to the user indicating that the system has a fault. This allows for maintenance to be undertaken accordingly. This feature of the system/method prevents the system from raising the Lock Pin temperature to unacceptable levels based on false data and also detects conditions wherein the sensors are not properly connected.

If the health of the system is found to be acceptable according to these readings, (or, in some cases, if this first step is not performed) the controller 150 is configured to energise the Lock Pin heater element 130 until the two temperature sensors 140 reach a second threshold value (referred to hereinafter as the heater element switch-off threshold). This second, heater element switch-off threshold value is the temperature (measured by the internal sensors 140) at which the controller is configured to then turn off the heater element 130. This second threshold may be used during both the de-icing and anti-icing functionalities.

Another method of detecting a fault may be performed which is aimed at detecting a fault in either of the two internal temperature sensors 140. In this method, if the difference between the two Lock Pin temperature sensor values is above a third threshold (referred to hereinafter as the internal sensor comparison threshold), the controller is configured to de-energise the heater element 130 and further configured to produce an output that indicates that there is a fault. This then alerts the user that the system requires maintenance. If there is no fault detected then the controller 150 may report that the system is ready for actuation to the cockpit systems.

This internal sensor comparison threshold value is therefore the allowable difference between the two internal temperature sensors. If this is exceeded there is a fault in either one of the internal temperature sensors. This threshold may be used during either or both of the de-icing and anti-icing functionalities.

The system also provides an anti-icing functionality which will now be described in greater detail.

During flight the controller 150 may energise the Lock Pin heater element 130 until the two temperature sensors 140 reach the second threshold value, i.e. the heater element switch off threshold. Once this threshold is reached, the heater element is de-energised and the system is determined by the controller 150 as not being faulty and the controller 150 outputs a message that reports that the aircraft wing is ready for actuation to the cockpit systems (i.e. there is not ice formation). A locking actuator 170 which is connected to the locking pin 120 can then actuate the locking pin 120.

If, during flight, the difference between the two Lock Pin temperature sensor values is above the third threshold, i.e. the internal sensor comparison threshold, the controller 150 is configured to de-energise the heater element 130 and provide an output that reports that it is unavailable, (i.e. the anti-icing system cannot be used as the actuation of the pin cannot be guaranteed) and requires maintenance to the cockpit systems.

The examples described herein provide advantages over known systems in that they allow for the removal and continued prevention of the formation of ice on a component such as a lock pin. This in turn reduces the maximum operating load for a Lock Pin Actuation System in comparison to known systems, which do not have this capability.

The examples described herein also provide the reduction of the maximum operating load, which in turn reduces the mechanical capability required from the system and therefore reduces the pressure or current to drive the system.

The invention claimed is:

1. A system for detecting a fault in at least one internal locking pin temperature sensor for use in an aircraft, said system comprising:
   a locking pin, wherein said locking pin comprises:
   an internal heater element located inside the locking pin; and
   said at least one internal locking pin temperature sensor located inside the locking pin;
   an actuation control computer, the actuation control computer configured to receive static air temperature information, the actuation control computer further being configured to receive measured temperature sensor information from said at least one internal locking pin temperature sensor;
   wherein the actuation control computer is configured to compare the static air temperature information with said measured temperature sensor information from said at least one internal locking pin temperature sensor and determine if a difference between the measurements is above a static v. internal temperature threshold value;
   wherein, if said difference is above said static v. internal temperature threshold value and said aircraft is not yet in flight, the actuation control computer determines that said at least one internal locking pin temperature sensor is faulty and disables said system.

2. A system for detecting a fault in at least one internal locking pin temperature sensor for use in an aircraft, said system comprising:
   a locking pin, wherein said locking pin comprises:
   an internal heater element located inside the locking pin; and
   said at least one internal locking pin temperature sensor located inside the locking pin;
   an actuation control computer, the actuation control computer configured to receive static air temperature information, the actuation control computer further being configured to receive measured temperature sensor information from said at least one internal locking pin temperature sensor;
   wherein the actuation control computer is configured to compare the static air temperature information with said measured temperature sensor information from said at least one internal locking pin temperature sensor and determine if a difference between the measurements is above a static v. internal temperature threshold value;
   wherein, if said difference is below said static v. internal temperature threshold value, the actuation control computer determines that said at least one internal locking pin temperature sensor is not faulty.

3. The system of claim 2, wherein when said at least one locking pin sensor is determined as not being faulty, the actuation control computer is configured to energise said internal heater element until said at least one internal locking pin temperature sensor measures a temperature that is above a heater element switch-off threshold value; and wherein upon reaching said heater element switch-off threshold value, the actuation control computer is configured to de-energise said internal heater element.

* * * * *